US006282645B1

(12) United States Patent
Yamaki

(10) Patent No.: US 6,282,645 B1
(45) Date of Patent: *Aug. 28, 2001

(54) COMPUTER SYSTEM FOR READING/WRITING SYSTEM CONFIGURATION USING I/O INSTRUCTION

(75) Inventor: Masayo Yamaki, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 104 days.

This patent is subject to a terminal disclaimer.

(21) Appl. No.: 09/025,239

(22) Filed: Feb. 18, 1998

Related U.S. Application Data

(63) Continuation of application No. 08/789,543, filed on Jan. 27, 1997, now Pat. No. 5,963,738, which is a continuation of application No. 08/266,677, filed on Jun. 28, 1994, now abandoned.

(30) Foreign Application Priority Data

Feb. 28, 1994 (JP) .................................................. 6-029738

(51) Int. Cl.⁷ ...................................................... G06F 9/40
(52) U.S. Cl. .......................... 713/100; 710/261; 713/340
(58) Field of Search ................................... 709/300–305, 709/310–332; 710/1–73; 713/1, 2, 100, 300–340

(56) References Cited

U.S. PATENT DOCUMENTS

| 4,799,145 | * | 1/1989 | Goss et al. ................................. 713/1 |
| 5,175,853 | * | 12/1992 | Kardach et al. ...................... 710/260 |
| 5,274,826 | * | 12/1993 | Kardach et al. ...................... 710/260 |
| 5,276,888 | * | 1/1994 | Kardach et al. ...................... 710/261 |
| 5,276,890 | | 1/1994 | Arai ....................................... 713/323 |
| 5,339,437 | * | 8/1994 | Yuen ..................................... 710/261 |
| 5,459,869 | * | 10/1995 | Spilo ..................................... 709/324 |
| 5,590,312 | | 12/1996 | Marisetty ......................... 395/500.44 |
| 5,613,135 | * | 3/1997 | Sakai et al. ............................. 710/62 |
| 5,630,147 | * | 5/1997 | Datta et al. .......................... 713/300 |
| 5,845,134 | * | 12/1998 | Arai ..................................... 713/322 |

FOREIGN PATENT DOCUMENTS

| 2-81227 | 3/1990 | (JP) . |
| 3-253955 | 11/1991 | (JP) . |
| 4-235634 | 8/1992 | (JP) . |
| 5-257808 | 10/1993 | (JP) . |

OTHER PUBLICATIONS

"Advanced Configuration and Power Interface Specification", Intel/Microsoft/Toshiba, Revision 1.0, Dec. 22, 1996, pp. 80–81.
Salter, Brett, "An Exception Handler for Windows 3," Dr. Dobb's Journal, Sep., pp. (5), Sep. 1992.*
Lafore, Robert, "Assembly Language Primer for the IBM PC & XT," Plume/Waite, pp. 71–74, 1984.*
Oney, Walter, "Using DPMI to Hook Interrupts in Windows 3," Dr. Dobb's Journal , pp.(6), Feb. 1992.*

* cited by examiner

Primary Examiner—St. John Courtenay, III
(74) Attorney, Agent, or Firm—Oblon, Spivak, McClelland, Maier & Neustadt, P.C.

(57) ABSTRACT

When a BIOS driver call request is generated in an environment of an OS operating in a protect mode, an IN or OUT instruction is executed to cause an I/O trap SMI generator to generate an I/O trap SMI. The mode of a CPU is switched from the protect mode to an SMM in accordance with the I/O trap SMI. In the SMM, the BIOS driver is executed. When the process of the BIOS driver is completed, the mode of the CPU is returned from the SMM to the protect mode, thereby shifting control to the OS. The BIOS can be directly called in the protect mode without building a routine for switching the CPU operating mode in the OS or application program operating in the protect mode.

23 Claims, 9 Drawing Sheets

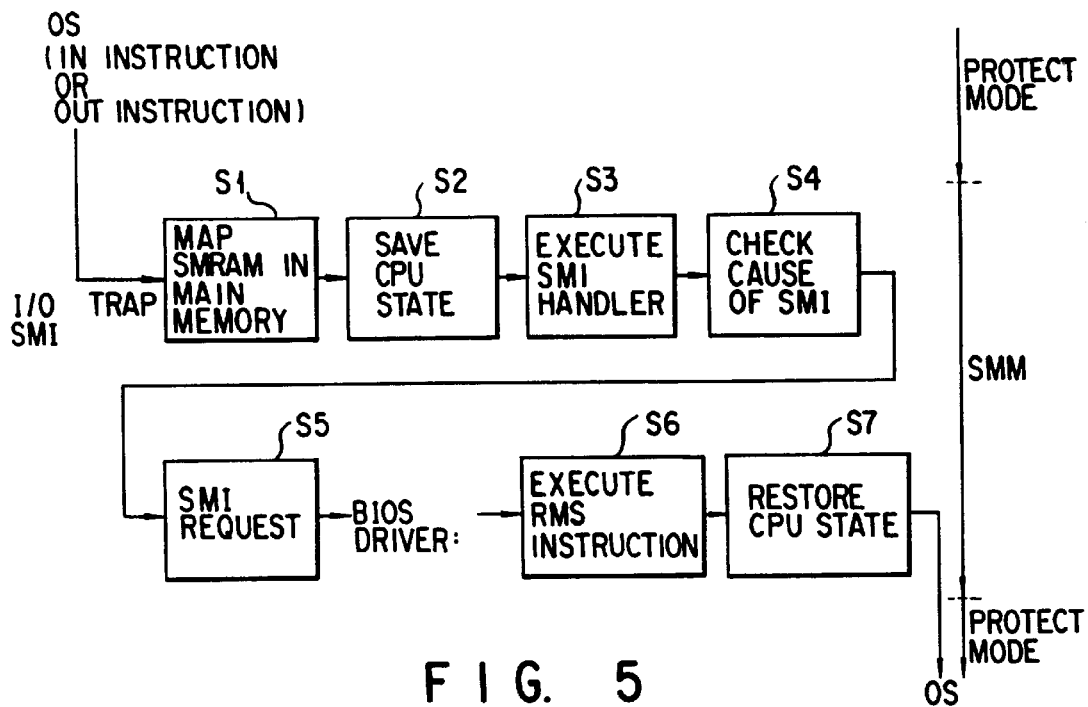
F I G. 5
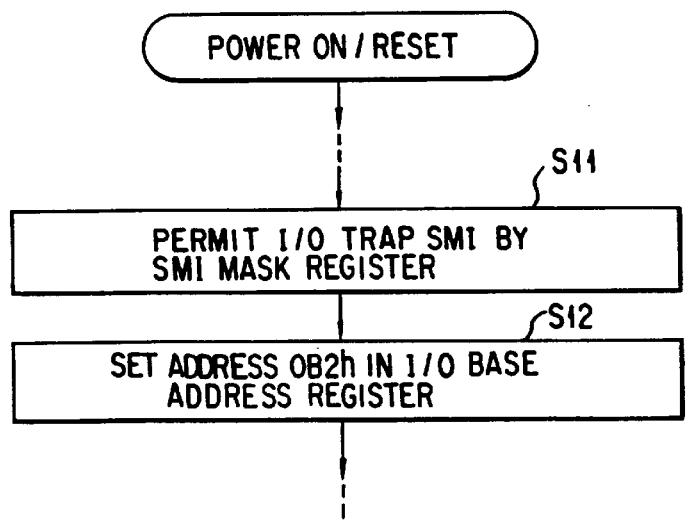
F I G. 6

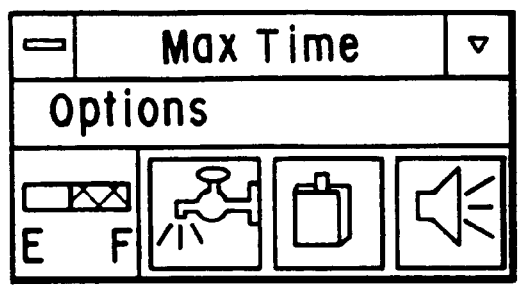
BATTERY GAUGE   RESUME MODE ICON
BATTERY SAVE
MODE ICON
F I G. 15
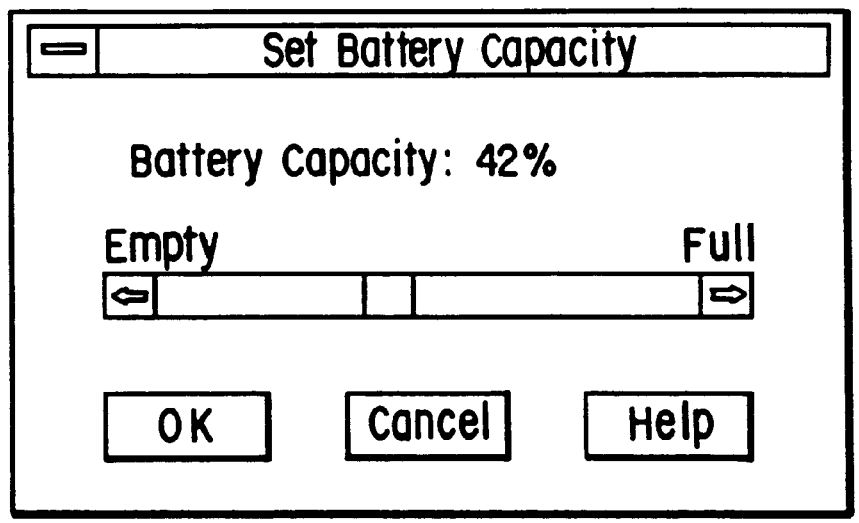
F I G. 16

COMPUTER SYSTEM FOR READING/ WRITING SYSTEM CONFIGURATION USING I/O INSTRUCTION

This application is a continuation of Ser. No. 08/789,543, filed Jan. 27, 1997 U.S. Pat. No. 5,963,738, which is a continuation of Ser. No. 08/226,677, filed Jun. 28, 1994, abandoned.

BACKGROUND OF THE INVENTION

1. Field of the Invention

The present invention relates to a laptop or note-book type portable personal computer system and, more particularly, to a computer system for interfacing different programs.

2. Description of the Related Art

In recent years, high-performance microprocessors have been developed with the advance of semiconductor techniques. A high-performance microprocessor is used as a CPU for a laptop or notebook type portable personal computer system.

Typical examples of such a CPU are Intel386 and Intel486 CPUs available from Intel, U.S.A. Such a CPU has two operating modes called a real mode and a protect mode. The real and protect modes employ different memory addressing schemes. In the real mode, the maximum accessible memory space is a 1-Mbyte area. In the protect mode, a maximum of 4-Gbyte memory area per task is accessible.

Operating systems executed by personal computer systems have been recently developed, and an operating system supporting a multitask function is gradually used. Most of such high-performance operating systems are configured to operate in the protect mode.

In a personal computer, a program called a system BIOS (Basic I/O System) for only hardware access is used to set hardware and the operating system in the system independent of each other and release the operating system from hardware access control. This system BIOS includes a plurality of function execution routines for hardware access. These function execution routines provide functions of performing various hardware access operations to the operating system.

The function execution routines of the system BIOS are realized by CPU software interrupt instructions (INT instructions). For this reason, the operating system calls a desired function execution function in accordance with an INT instruction to perform necessary hardware control However, all the system BIOS function execution routines are designed to be operated in the real mode because the system BIOS is arranged on an assumption that an operating system is executed in the real mode.

For this reason, the following operation must be performed. In an operating system environment set in the protect mode, as shown in FIG. 1, after the CPU operating mode is temporarily changed from the protect mode to the real mode, an INT instruction is executed to call a corresponding function execution routine. When this function execution routine is completed to cause the control to return to the main routine, the real mode must be changed to the protect mode again.

For this reason, when an operating system operating in the protect mode is used, a routine for changing the CPU operating mode and a routine for calling the function execution routine of the system BIOS in accordance with the INT instruction must be built into the BIOS interface portion of the operating system, thereby undesirably complicating coding.

In a conventional case, the routine for changing the CPU operating mode must be built into the BIOS interface portion such as an operating system operating in the protect mode, thereby undesirably complicating coding.

SUMMARY OF THE INVENTION

It is an object of the present invention to provide a computer system capable of allowing use of a CPU system management function to interface programs operated in different environments as in a program such as an operating system operating in a protect mode and an BIOS function execution routine operating in a real mode, and for allowing easy access of the BIOS function execution routine from an operating system or the like operating in the protect mode, and a method of interfacing the programs in this computer system.

A computer system according to the present invention comprises: a CPU having a first operating mode using a first address calculation form and capable of accessing a predetermined memory space, a second operating mode using a second address calculation form different from the first address calculation form and capable of accessing a memory space larger than that in the first operating mode, and a system management mode using an address calculation form substantially identical to the first address calculation form and capable of executing a predetermined system management program, the CPU being operated such that after CPU status data is saved in a memory in response to supply of a predetermined interrupt signal to the CPU, a current CPU operating mode is switched to the system management mode, contents s of the memory are restored in a CPU register in response to execution of a resume instruction in the system management mode, and the operating mode set before the interrupt signal is supplied is resumed from the system management mode; an interrupt signal generator, connected to the CPU through a system bus, for trapping an I/O address on the system bus which belongs to an address range designated by a predetermined I/O base address, thereby generating the interrupt signal; and an interface means for interfacing a second program configured to be operated in the second operating mode and a first program configured to be operated in the first operating mode, the interface means further comprising means for, in response to a call request for the first program from the second program executed by the CPU in the second operating mode, executing an I/O instruction to the I/O port belonging to the address range designated by the I/O base address to cause the interrupt signal generator to generate the interrupt signal, means for, when the CPU is switched to the system management mode in accordance with the interrupt signal, executing the system management program to call the first program and causing the CPU in the system management mode to execute the first program, and means for executing a resume instruction in response to execution completion of the first program so as to change the system management mode of the CPU to the second operating mode in which the second program was being executed.

In this computer system, the interrupt signal by I/O trapping is used to interface the second program such as an operating system and the first program such as a BIOS program. The interface means causes the interrupt signal generator to generate an interrupt signal caused by I/O trapping upon execution of an IN or OUT I/O instruction for a specific I/O port in response to a call request from the second program to the first program. The interface means then causes the CPU in the system management mode to execute the first program and executes the resume instruction in response to its execution completion. The address calculation form of the system management mode is the same as the address calculation mode in the first operating mode accessible by the first program. For this reason, the first program can be normally executed in the system management mode.

The CPU switches the second operating mode, in which the second program is currently executed, to the system management mode in response to generation of an interrupt signal. The CPU then saves the CPU status data in the memory. When the resume instruction is executed, the CPU restores the CPU status data from the memory to resume the second operating mode from the system management mode. Therefore, control returns to the second program executed immediately preceding generation of the interrupt signal.

As described above, in this system, when a call request for the first program is generated in the second operating mode, the CPU is automatically switched to the system management mode, and the first program is executed. Thereafter, the mode is switched from the system management mode to the second operating mode. Therefore, the first program is directly called from the second program and can be executed without building a CPU operating mode switching routine into the second program.

A procedure necessary for generating an interrupt signal is to cause the interface means to execute the IN or OUT instruction because the interrupt signal caused by I/O trapping is used. Therefore, the first program can be called at high speed because the interrupt signal can be generated immediately in response to generation of the first program call request.

The interface means can comprise a first interface means (an SMI handler built into the BIOS) and a second interface means (i.e., a built-in routine in the OS or application program operating in the protect mode to cause an I/O trap SMI generator to generate an SMI) for executing a built-in interface program in the second program to interface with the first interface means.

In this case, the second interface means can cause the first interface means to call the first program upon execution of an IN or OUT instruction in place of the conventional INT instruction.

The interface means preferably executes the resume instruction after the CPU status data set upon execution completion of the function execution routine is temporarily stored in the memory. When the resume instruction is executed, the CPU restores the contents of the memory in the CPU register. At this time, the CPU status data set upon execution completion of the function execution routine is returned to the CPU register. For this reason, once the CPU status data set upon execution completion of the function execution routine is temporarily saved to efficiently transfer output data obtained by the function execution routine to the operating system through the CPU register.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a view For explaining a CPU operation when an I/O trap SMI is issued to the CPU arranged in the system of this embodiment;

FIG. 6 is a flow chart for explaining a preparation process for generating the I/O trap SMI in the system of this embodiment;

FIG. 15 is a view showing a horizontal MaxTime battery gauge and toolbar displayed by the MaxTime utility;

FIG. 16 is a view showing a set battery capacity dialogue box displayed by the MaxTime utility.

DETAILED DESCRIPTION OF THE PREFERRED EMBODIMENTS

The preferred embodiments of the present invention will be described with reference to the accompanying drawings.

Figure 1:
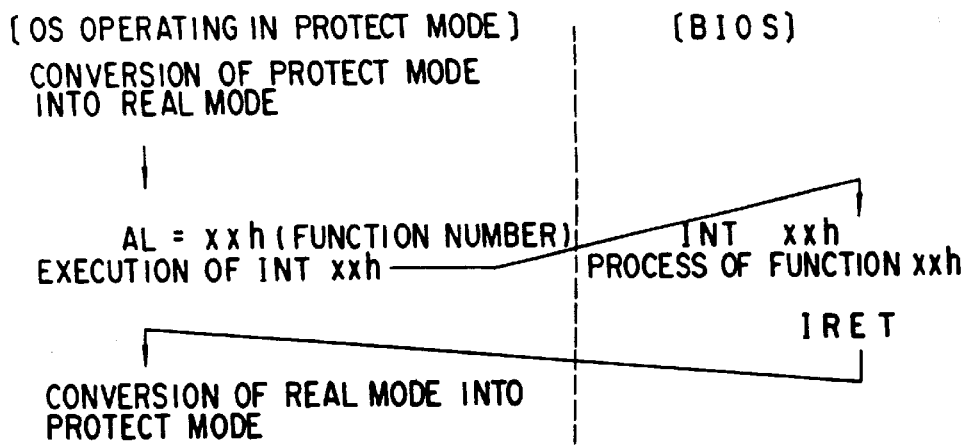
FIG. 1 is a view showing the principle of a CPU operation for calling a function execution routine in a protect mode in a prior art.
Figure 2:
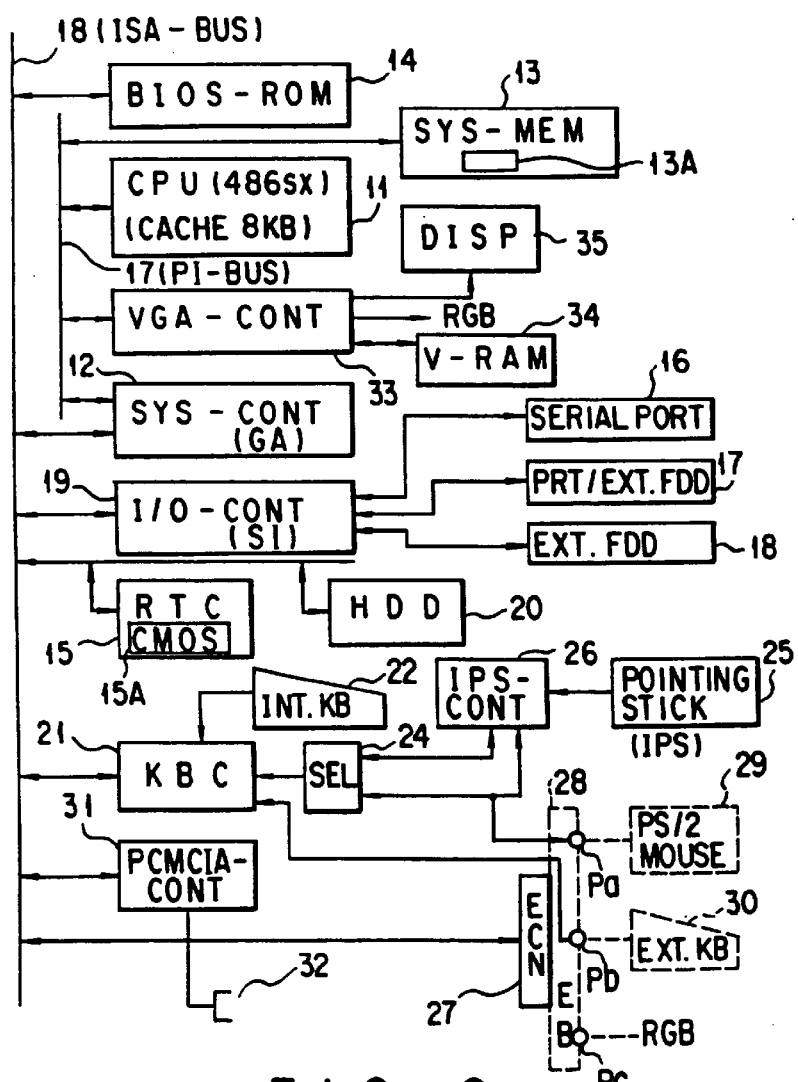
FIG. 2 is a block diagram showing the overall arrangement of a computer system according to an embodiment of the present invention.

FIG. 2 is a block diagram showing the overall arrangement of a computer system according to an embodiment of the present invention. Referring to FIG. 1, a CPU 11, a main memory (SYS-MEM) 13, and the like are connected to an ISA (Industry Standard Architecture) system bus (ISA-BUS)

18 through a system controller (SYS-CONT (GA)) 12 and a peripheral interface bus (PI-BUS) 17. Various I/O devices including a control memory (BIOS-ROM) 14 and an I/O controller (I/O-CONT (S1)) 19 are connected to the system bus (IS-BUS) 18.

Figure 7:
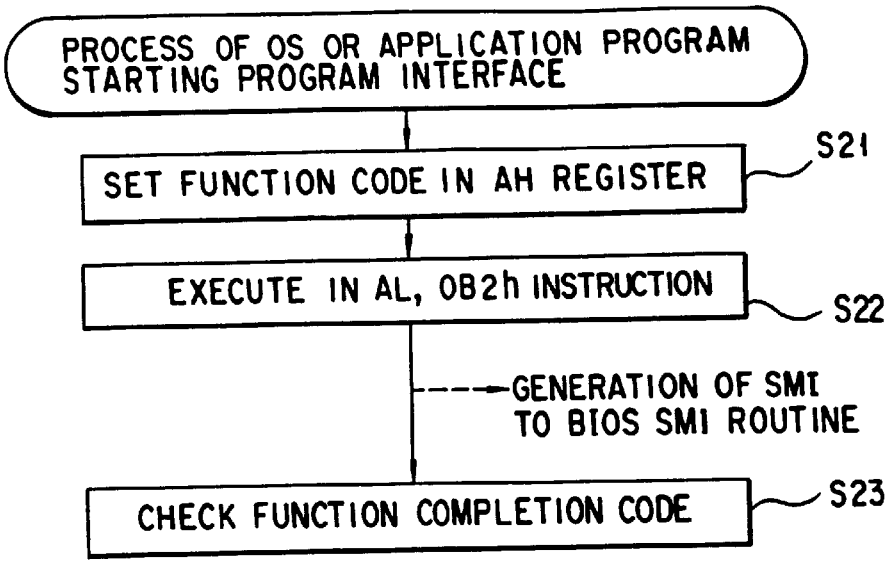
FIG. 7 is a flow chart for explaining the operation of the BIOS interface portion of an OS in the system of this embodiment.
Figure 8:
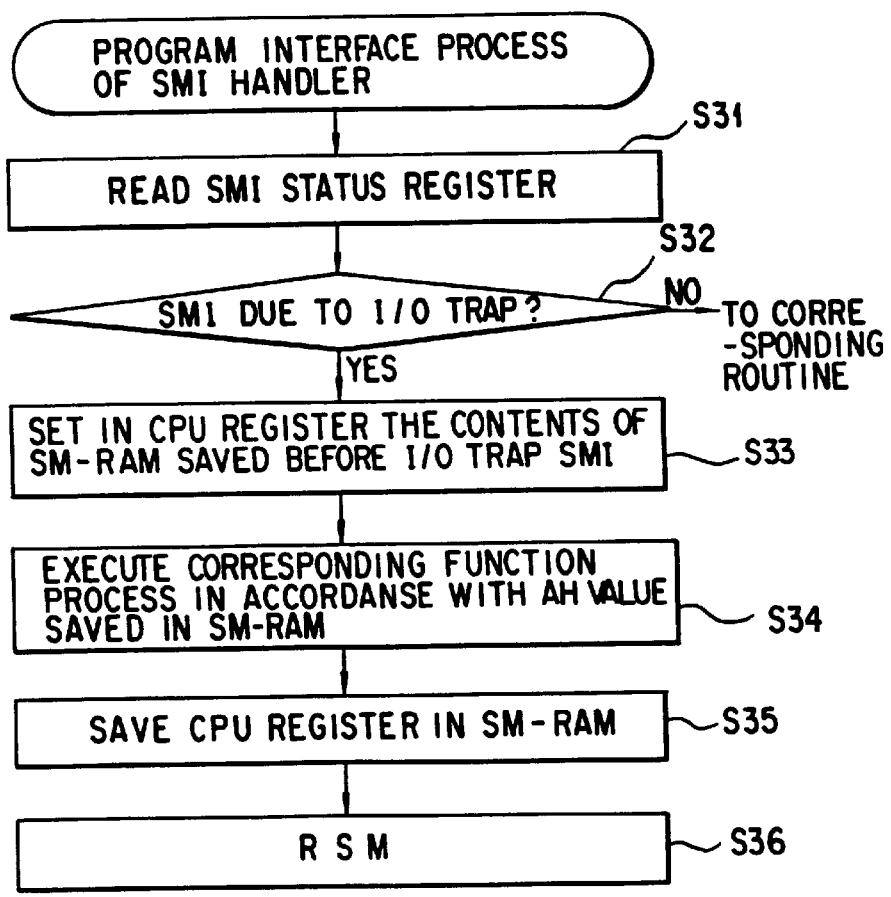
FIG. 8 is a flow chart for explaining a program interface process between the OS and the BIOS to be executed by an SMI handler in the system of this embodiment.
Figure 10:
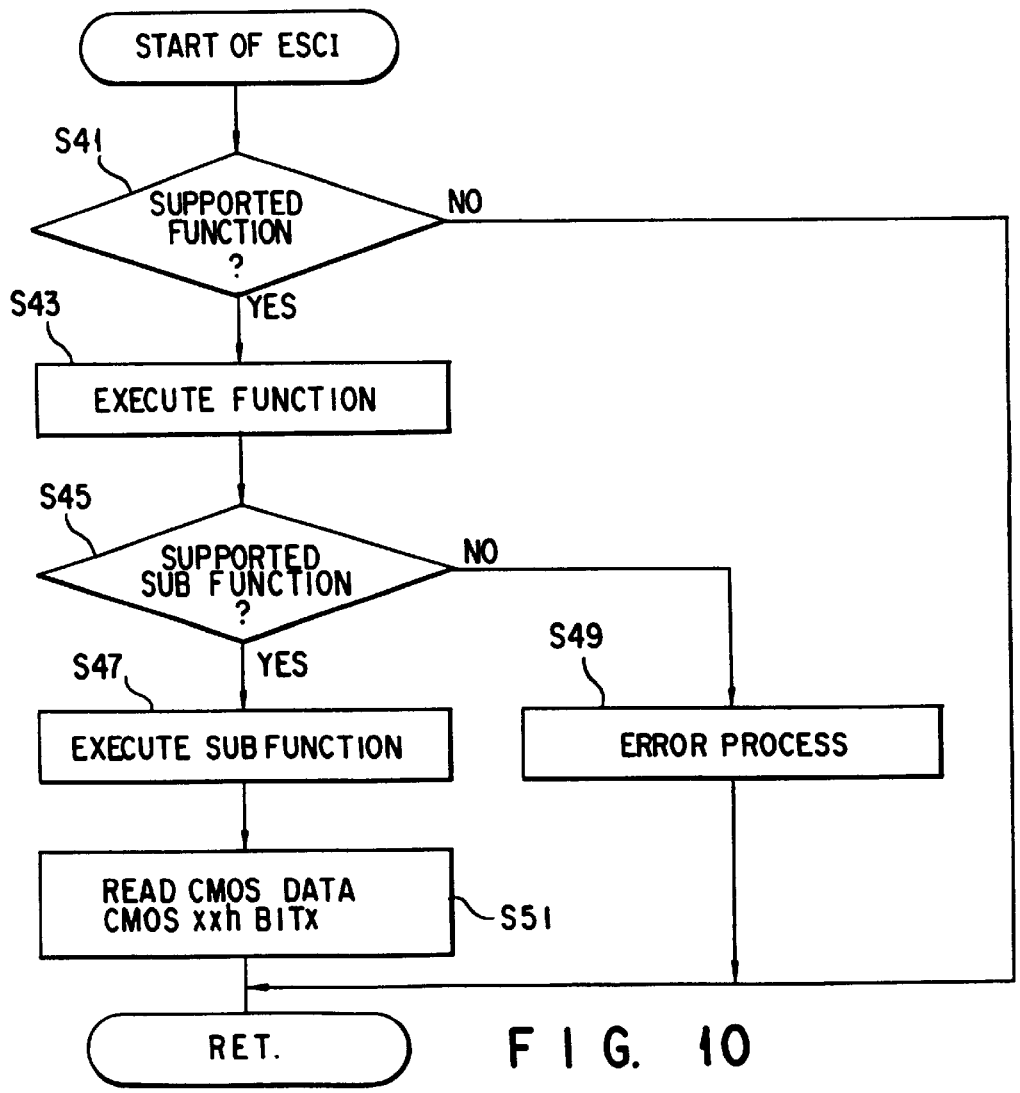
FIG. 10 is a flow chart showing CPU control of an enhanced system configuration interface (ESCI) when the enhanced system configuration interface (ESCI) of the present invention is started.
Figure 11:
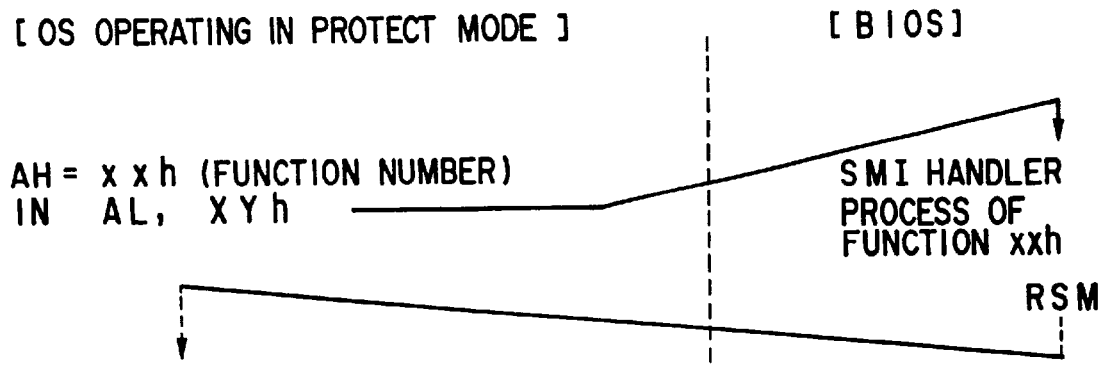
FIG. 11 is a view showing the principle of a process for generating an SMI, using an IN instruction to a specific I/O port, from the OS operating in the protect mode, executing the function in the SMI handler, and completing the SMI in accordance with an RSM instruction.

The CPU 11 controls the overall system and executes processes according to programs stored in the main memory (SYS-MEM) 13 and the control memory (BIOS-ROM) 14. In an initialization process (IRT process) upon power-ON, a BIOS process routine shown in FIG. 6 is executed, and at the same time, the interface and handler shown in FIGS. 7, 8, and 10 are executed.

The main memory (SYS-MEM) 13 is used as an execution program storage area, a work area, and the like and has an SMRAM 13A (to be described later).

The system controller (SYS-CONT (GA)) 12 is constituted by a gate array and has various functional logics for memory control, bus control, address latch control, I/O register control, and the like. The CPU 11 is connected to the system bus (ISA-BUS) 18 through this system controller (SYS-CONT (GA)) 12.

The I/O controller (I/O-CONT (SI)) 19 is constituted by a super-integrated circuit and realizes a support function of a memory or the like. The I/O controller 19 incorporates two DMA controllers (DMACs), two interrupt controllers (PIs), a timer (PIT), a serial I/O controller (SIO), a floppy disk controller (FDC), an oscillator (VFO), and the like. This I/O controller (I/O-CONT (SI)) 19 is connected to a serial port 16, a printer port (PRT/Ext. FDD) 17, an external FDD port (Ext. FDD) 19, a power controller (not shown) having a microprocessor arrangement, and the like.

A real time clock (RTC) 15 has a static RAM (CMOS memory) 15A of a CMOS arrangement always applied with a battery power supply voltage. System configuration data and various types of information set by a MaxTime utility are stored in this CMOS memory.

A standard hard disk drive 20 has an IDE (Integrated Drive Electronics) interface and is directly accessed and controlled by the CPU 11. Various programs are stored in this hard disk drive (HDD) 20. When the system is bootstrapped, the various programs are loaded in the main memory (SYS-MEM) 13.

A standard internal keyboard (Int. KB) 22 is connected to the keyboard controller (KBC) 21. An external keyboard (Ext. KB) 30 can be connected to the keyboard controller 22 through an expansion connector (ENC) 27. A dedicated processor (IPS-Cont) 26 for controlling a standard internal pointing stick 25 arranged on the internal keyboard (Int. KB) 22 is connected to the keyboard controller 21 through a pointing device selector (SEL) 24. At the same time, an external mouse (PS/2 Mouse) 29 is connected to the keyboard controller 21 through the expansion connector (ENC) 27 and a pointing device selector (SEL) 24, as needed.

The portable internal pointing stick 25 is arranged at part of the key-top arrangement surface.

The pointing device selector (SEL) 24 switches and controls a data transfer path for the external mouse (PS/2 Mouse) 29 and the data transfer path for the dedicated processor (IPS-Cont) 26.

An expansion unit can be detachably connected to the expansion connector (ECN) 27. In this case, the expansion unit (EB) 28 called a port replicator is connected to the expansion connector 27. The external mouse 29, the external keyboard 30, an external color monitor (RGB), and the like can be connected to the expansion connector 27 through expansion ports Pa, Pb, Pc, . . . , of this port replicator 28. The external mouse 29 optionally connected to the expansion port Pa of this port replicator 28 is a high-performance intelligent mouse incorporating a dedicated processor and is initialized and controlled under the control of the CPU 11. A PCMCIA controller (PCMCIA-CONT) 31 has a card slot 32 for supporting all types of PCMCIA cards.

A display controller (VGA-CONT) 33 has display control functions complying with the VGA specifications. The display controller 33 draws, in an image memory (V-RAM) 34, image data from the CPU 11 through the peripheral interface bus (PI-BUS) 17. The display controller 33 drives a standard internal display device (DISP) 35 of an LCD panel arrangement and an optionally connected color CRT monitor. As an initial setting screen during system bootstrapping, a setup screen having a pointing device mode selection item for allowing the operator to select an automatic selection mode as a default value or a simultaneous use mode is displayed.

Figure 3:
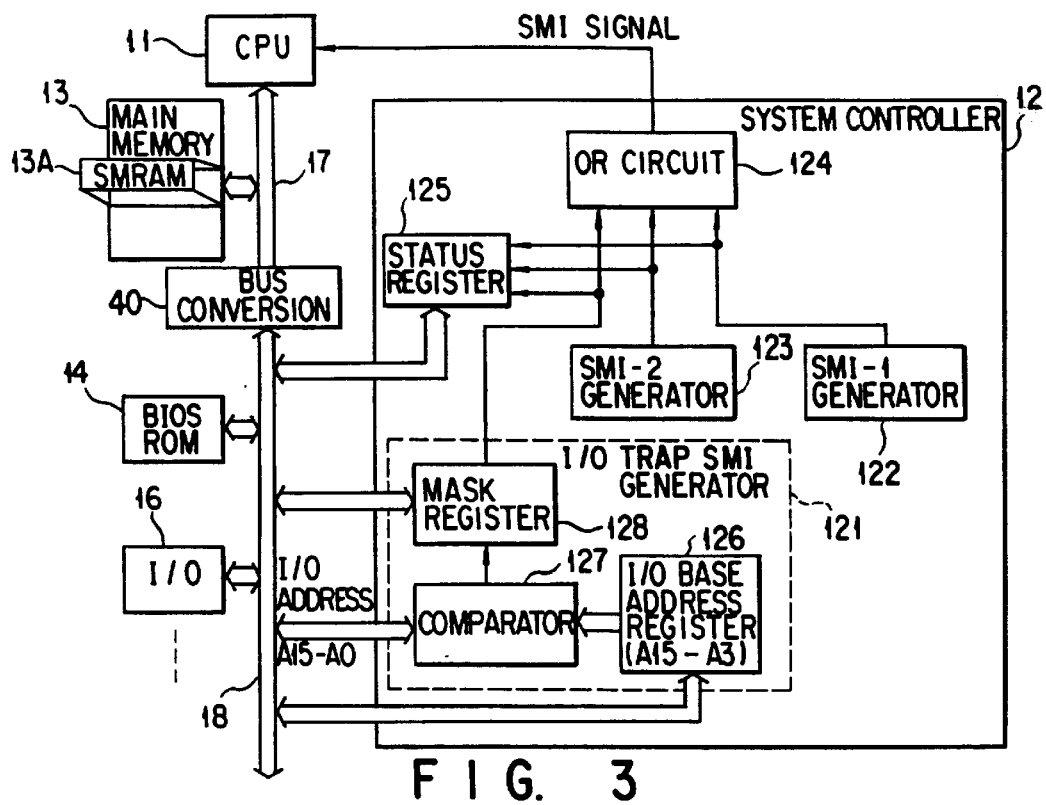
FIG. 3 is a block diagram showing the detailed arrangement of a system controller shown in FIG. 2.

FIG. 3 is a block diagram showing the detailed arrangement of the system controller 12 shown in FIG. 2.

The CPU 11 comprises, e.g., a microprocessor LS Enhanced Intel486 (available from Intel, U.S.A.) as a processor which supports an SMI (System Management Interrupt). When the SL Enhanced Intel486 is used, the CPU 11 has the following system management function.

More specifically, as operating modes for executing programs such as application programs and an operating system (OS), the CPU 11 has an operating mode for realizing a system management function called an SMM (System Management Mode) in addition to a real mode, a protect mode, and a virtual 86 mode.

The real mode is a mode capable of accessing a maximum of 1-Mbyte memory space. A logical address is translated into a physical address in accordance with an address calculation form for determining the physical address using an offset value from a base address represented by a segment register.

On the other hand, the protect mode is a mode capable of accessing a maximum of 4-Gbytes per task. Linear addresses are determined using an address mapping table called a descriptor table. These linear addresses are finally translated into physical addresses in accordance with paging.

As described above, the protect and real modes employ different memory addressing schemes.

The system management mode (SMM) is a pseudo real mode. The address calculation form in this mode is the same as that of the real mode. Neither a descriptor table is referred to nor paging is performed.

When a system management interrupt (SMI) is issued to the CPU 11, the operating mode of the CPU 11 is switched from the current operating mode (e.g., the real, protect, or virtual 86 mode) to the SMM. When the mode is switched to the SMM using the SMI, the CPU 11 saves the CPU status data as the contents of the CPU register in an SMRAM 13 A. When a resume instruction (RSM instruction) is executed in the SMM, the CPU 11 restores the CPU status data from the SMRAM 13 A to the CPU register, thereby resuming the operating mode prior to generation of the SMI. In this SMM, a system management program such as an SMI handler is executed.

The SMI is a kind of nonmaskable interrupt (NMI), but is an interrupt having the highest priority higher than a normal NMI and a maskable INTR. When this SMI is issued, the system management program can be started without depending on a currently executed application program environment or an operating system environment.

The system controller 12 is a gate array for controlling memories and I/O interfaces in this system. Hardware for controlling generation of an SMI signal to the CPU 11 is built into the system controller 12.

The main memory 13 stores the operating system, target application programs, user data generated by the application programs, and the like.

The SMRAM (System Management RAM) 13A is an overlay memory mapped in the address space from address 30000H to 3FFFFH. This memory can be accessed only when an SMI signal is input to the CPU 11. The address range in which the SMRAM is mapped is not fixed. The address range can be changed to an arbitrary location in the 4-Gbyte space by a so-called SMBASE register. The SMBASE register can be accessed in only the SMM. The default value of the SMBASE register is address 3000H.

When the mode of the CPU 11 is changed to the SMM, the CPU status data, i.e., the register data of the CPU 11 upon generation of an SMI, are saved in the form of a stack in the SMRAM 13A. An instruction for calling a system management program in the BIOS ROM 14 is stored in the SMRAM 13A. This instruction is an instruction executed for the first time when the CPU 11 is set in the SMM. Control is shifted to the system management program upon execution of this instruction.

The BIOS ROM 14 stores a system BIOS (Basic I/O System) and is constituted by a flash memory so as to allow program updating. The system BIOS is a system of function execution routines for accessing various hardware arrangements in the system and is operated in the real mode.

The system BIOS includes an IRT routine executed upon power-ON of the system and BIOS drivers for controlling various hardware arrangements. Each BIOS driver includes a plurality of function execution routines corresponding to functions for offering a plurality of functions for hardware control to the operating system and an application program.

System management programs such as an SMI handler and an SMI service routine, which are executed in the SMM, are included in the BIOS ROM 14. The SMI handler is used to start an SMI service routine or a BIOS driver in accordance with the cause of SMI generation. When an SMI is generated by I/O trapping, the BIOS driver is started; otherwise, an SMI service routine corresponding to the cause of SMI generation is started. In this manner, the SMI caused by I/O trapping is utilized as a program interface for starting the BIOS driver.

A bus conversion circuit 40 is a bridge circuit for connecting the CPU local bus 17 and the system bus 18. The bus conversion circuit 15 performs bus width conversion between the 32-bit data bus of the CPU local bus 17 and the 16-bit data bus of the system bus 18.

The hardware arrangement for controlling SMI arrangement, which is arranged in the system controller 12, will be described below.

As shown in FIG. 3, the system controller 12 comprises an S/O trap SMI generator 121, SMI-1 and SMI-2 generators 122 and 123 for generating SMIs by a cause other than I/O trapping, an OR circuit 124, and an SMI status register 125.

The I/O trap SMI generator 121 is a circuit for generating an I/O trap SMI signal used as a program interface. The I/O trap SMI generator 121 traps an I/O address on the system bus 18 which belongs to a predetermined address range, thereby generating an I/O trap SMI signal. This I/O trap SMI generator 121 comprises an I/O base address register 126, an address comparator 127, and a mask register 128, as shown in FIG. 3.

The I/O base address register 126 is a register for allowing the CPU 11 to perform read/write access and is connected to the system bus 18. This I/O base address register 126 holds an I/O base address. This I/O base address is set in the I/O base address register 126 in accordance with the IRT routine during power-ON of the system. An I/O base address to be set is an unused address of a plurality of I/O base addresses to be assigned to I/O devices.

The comparator 127 compares the I/O address output onto the system bus 18 with the I/O base address in the I/O base address register 126 in the I/O read/write cycle and generates an I/O trap SMI signal when the I/O address belongs to the address range designated by the I/O base address.

The mask register 128 is a register for allowing the CPU 11 to perform read/write access and is connected to the system bus 18. This mask register 128 holds mask data for allowing or inhibiting generation of the I/O trap SMI signal. This mask data is set in accordance with the IRT routine during power-ON of the system. When the I/O trap SMI is used as a program interface for calling the function execution routine of the BIOS, mask data for allowing generation of the I/O trap SMI signal is set.

In practice, a plurality of such circuit sets are prepared in the I/O trap SMI generator 121, and one of these circuit sets is utilized as a program interface for calling a BIOS driver. An I/O trap SMI from any other circuit set is utilized to generate a local standby SMI. Two or more circuit sets can be utilized as program interfaces for calling BIOS drivers, as a matter of course.

In this case, different I/O base addresses are set for these different circuit sets, so that interfaces utilizing a plurality of I/O trap SMIs having different trap addresses can selectively call a plurality of BIOS drivers.

The SMI-1 and SMI-2 generators 122 and 123 generate, for example, a software SMI, a global standby SMI, a local standby SMI, an external input SMI, an SMI generated by a suspend resume button signal from a power supply, and the like. These SMIs are described in CHAPTER 14 "SYSTEM AND POWER MANAGEMENT" of "386SL MICROPROCESSOR SUPER SET SYSTEM DESIGN GUIDE" published on 1990 from Intel, U.S.A.

When the I/O trap SMI generator 121, or the SMI-1 or SMI-2 generator 122 or 123 generates an SMI signal, the OR circuit 124 supplies this SMI signal to the CPU 11.

The I/O trap SMI generator 121, or the SMI-1 or SMI-2 generator 122 or 123 keeps the SMI signal in the active state until the SMM of the CPU 11 is reset. For this reason, when another SMI signal is generated during the current SMI process for a given SMI signal, the CPU 11 is set in the SMM again in accordance with the SMI signal generated during the SMI process after the SMM corresponding to the first SMI signal is ended.

The SMI status register 125 holds status data representing an SMI generation cause. The SMI status register 125 holds outputs from the I/O trap SMI generator 121 and the SMI-1 and SMI-2 generators 122 and 123.

A program interface utilizing the I/O trap SMI as the characteristic feature of the present invention will be described below.

Figure 4:
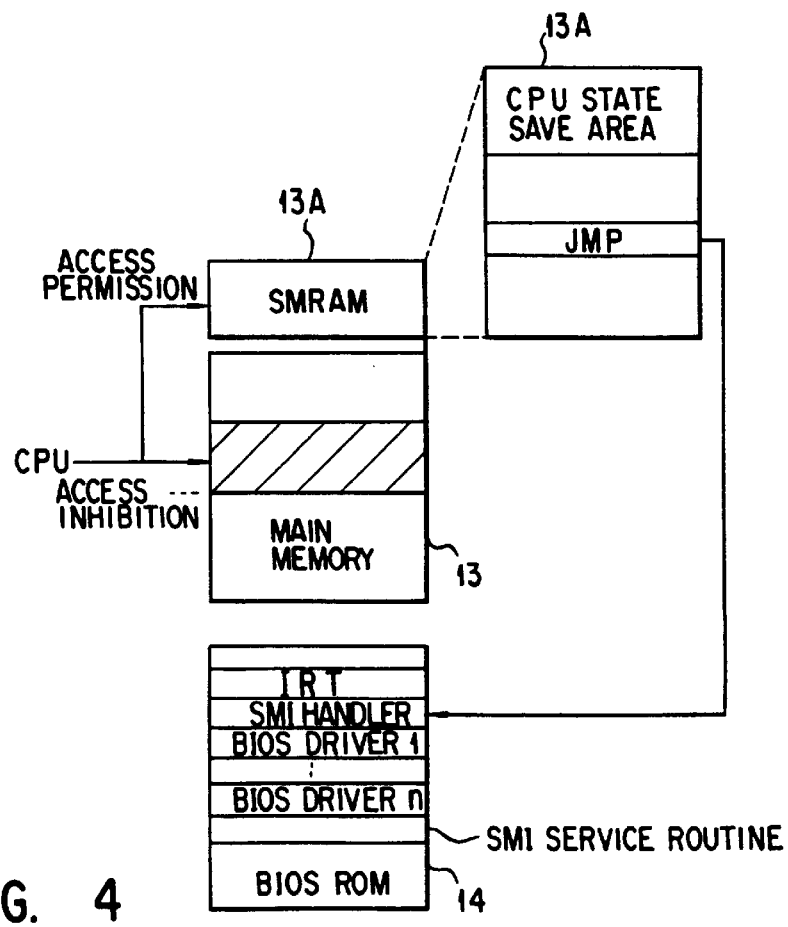
FIG. 4 is a view for explaining a memory map when an SMI is issued to a CPU arranged in the system of this embodiment.

A series of operations for calling a BIOS driver function upon causing the operating system or an application program in the protect mode to utilize the program interface of the present invention will be described with reference to FIGS. 4 and 5.

A BIOS interface for executing an IN or OUT I/O instruction in response to a call request to a specific BIOS driver is built into the operating system or each application program. This BIOS interface sets a function code for designating the function execution routine of this BIOS driver in an AH register, the BIOS interface executes the IN or OUT I/O instruction for an I/O port belonging to the address range of the I/O base address set in the I/O base address register 126 to start the program interface utilizing the I/O trap SMI.

Upon execution of this IN or OUT instruction, the I/O address belonging to the address range designated by the I/O base address is output onto the system bus 18. This I/O address is trapped by the I/O trap SMI generator 121, and the I/O trap SMI signal is supplied to the CPU 11.

When the I/O trap SMI signal is input to the CPU 11, the CPU 11 is switched from the protect mode to the SMM. When the CPU 11 is set in the SMM, the CPU 11 maps the SMRAM 13A to the address space from address 30000H to 3FFFFH of the main memory 13 (step S1 ). By this operation, the area of the main memory 13 from address 30000H to 3FFFFH cannot be accessed, and instead, the SMRAM 13A can be accessed.

The SMRAM 13A includes a CPU state save area, an SMI handler work area, and the like. In addition, a jump code for designating the SMI handler of the ROM 14 as an Interrupt destination is set in the SMRAM 13A. As described above, the BIOS ROM 14 stores the IRT routine, the SMI handler, the plurality of BIOS drivers, and various SMI service routines for performing power management and the like.

The CPU 11 saves the CPU status data (or called a context) as the contents of the various registers of the CPU 11 upon reception of the SMI in the CPU state storage area in the form of a stack (step S2). The CPU 11 then fetches the code of the SMM start address (38000H), i.e., the jump code set at address 38000H of the SMRAM 13A. The CPU 11 then executes the SMI handler of the BIOS ROM 14 which is designated by this jump code (step S3). The process in steps S1 to S3 is executed by the CPU 11 itself, i.e., the microprogram of the CPU 11.

The SMI handler called upon execution of the jump code checks an SMI generation cause to determine a specific cause of the SMI (step S4). In this process, SMI status information set in the SMI status register 124 in the system controller 12 is referred to. If the SMI is an SMI caused by I/O trapping, the SMI handler requests the function execution routine of a specific BIOS driver of the plurality of BIOS drivers of the BIOS ROM 14 (step S5).

A specific BIOS driver called in response to an I/O trap SMI is predetermined. For example, a function expansion BIOS driver newly added in the BIOS ROM 14 can be called. One of the existing BIOS drivers (INT10h through 1Fh, and 40h through 4Fh) realized by software interrupts of the CPU 11 can be defined as a BIOS driver to be called in response to an I/O trap SMI. A specific function execution routine of this BIOS driver is determined by the value of a function code of the operating system or each application program.

When the process of the BIOS driver is completed, the SMI handler executes a resume (RSM) instruction (step S6). By execution of this RSM instruction, the CPU status data is restored from the SMRAM 13A to the CPU register (step S7), so that the SMM of the CPU is reset, and the CPU 11 is set in the protect mode. As a result, control is returned to the interrupted operating system or application program.

As described above, when a program interface using an I/O trap SMI is utilized, the operating system or application program which is operated in the protect mode executes only the IN or OUT instruction for generating an I/O trap SMI. That is, any procedure for changing the mode from the protect mode to the real mode need not be performed.

A setup process for the I/O trap SMI generator 121 will be described with reference to a flow chart in FIG. 6.

This setup process is executed by the IRT routine when the system is powered on or reset.

In the IRT routine, an I/O trap SMI generation permission data is set in the mask register 128 in the I/O trap SMI generator 121 (step S11). The IRT routine then sets an I/O base address (OB2h) in the I/O base address register 126 (step S12). This I/O base address value of OB2h is the base address value of a predetermined unused I/O port. That is, the following initial setup is performed so as to cause the I/O trap SMI to start a BIOS expansion function (INT15h, AH=44h):

I/O Base Low Address Device 3 Register (24. D8h)=B2h

I/O Base High Address Device 3 Register (24. D9h)=00h

I/O Mask Device 3 Register (24. DAh)=80h

I/O Idle timer Device 3 Register (24. DBh)=00h

System Management Control Register (24. B6h bit 4)=1

I/O Base Low Address Device [0:5 ] P0–25 (index: C0, C8, Do, D8, Eo, E8)H W/R (TRP_ADRL_DEV[0:5])

Bit 7 6 5 4 3 2 1 0

W/R TA07 TA06 TA05 TA04 TA03 TA02 TA01 TA00

P-ON 0 0 0 0 0 0 0 0 RESET

TA[07:00]: Indicate lower 8 bits of I/O Trap Base Address

I/O Base High Address Device [0:5] P-025 (index:

C1, C9, D1, D9, E1, E9)H

W/R (TRP_ADRG_DEV[0:5])

Bit 7 6 5 4 3 2 1 0

W/R TA15 TA14 TA13 TA12 TA11 TA10 TA09 TA08

P-ON 0 0 0 0 0 0 0 0 RESET

TA[15:08]: Indicate upper 8 bits of I/O Trap Base address

System Management Control P-025 (index: B6)H W/R (SM_REQ_CNTRL)

Bit 7 6 5 4 3 2 1 0

W/R SM_EN ESMIEN N/U LTRPEN LSTBEN GSTBEN SUSEN SWEN

P-ON 0 0 0 0 0 0 0 0 RESET

SM_EN: Global enable bit for all SMI functions. When set, SMI functionality is enabled. When reset, all SMI functionality is disabled, and all status bits are cleared. Counter for Local standy time-out, System power off (Global standby time-out) and Software SMI are not cleared.

ESMIEN: When set, external input SMI is enabled. The SMI input from PCMCIA-G/A will be the external input SMI. When reset, external input SMI is disabled, and ESMIST (bit 6) of SM_REQ_STS (index: B7H) register is cleared.

LTRPEN: When set, I/O trap functionality is enabled. When reset, I/O trap is disabled. Also all status bits of LTPR_STS (index: BBh) are cleared, and LTRPST (bit 4) of SM_REQ_SYS (index: B7H) register is cleared.

LSTBEN: When set, SMI by global standby timer is enabled. When reset, SMI by local standby timer is disabled. Also all status bits of LSTDBY_SYS (index: BAH) register are cleared, and LSTBST (bit 3) of SM_REQ_SYS (index: B7H) register is cleared.

GSTBEN: When set, SMI by global standby timer is enabled. When this bits is set, the counter is loaded, and starts the counting. The counter value is reloaded if system event occurs. When reset, global standby timer is reset, and GSTBST (bit 2) of SM_REW-STS (index: B7H) register is cleared.

SUSEN: When set, SMI from power supply is enabled. When reset, SMI from power supply is disabled, and SUSST (bit 1) of SM_REQ_STS (index: B7H) register is cleared.

SWEN: When set, Software SMI is enabled. When this bit is set, the counter is loaded and starts the counting. When reset, Software SMI is disabled, and SWST (bit 0) of SM_REQ_STS (index: B9H) register is cleared. General System Management Status Register P0–25 (index: B7H) W/R (SM_REQ_STS) Bit 7 6 5 4 3 2 1 0 W/R N/U ESMIST N/U LTRPST LSTBST GSTBST SUSST SWST P-ON 0 0 0 0 0 0 0 0 RESET ESMIST: when set, it indicates that external input SMI (SMI from PCMCIA-G/A) is asserted. This bit is cleared when ESMIEN (bit 6) or SM_EN (bit 7) of SM_REQ_CETRL (index: B6H) register is reset.

LTRPST: When set, it indicates that SMI is invoked by I/O trap function. This bit is cleared when corresponding enable bit of LTRP_STS (index: BBH) register is reset or when LTRPEN (bit 4) or SM_EN (bit 7) of SM_REQ_CNTRL (index: B6H) register is reset.

The process of a BIOS interface built into the operating system or application program will be described with reference to a flow chart in FIG. 7.

The BIOS interface of the operating system or application program sets a function code for designating a predetermined function execution routine of the BIOS driver in the AH register of the CPU 11 (step S21).

The function codes are exemplified as follows:

| Function code (AH) | Function |
|---|---|
| F0 | SCI support check |
| F1 | open interface |
| F2 | close interface |
| F3 | get system configuration |
| F4 | set system configuration |
| F5 | set default configuration |

More specifically, function code F0 checks whether an SCI (System Configuration Interface) is supported on a machine. Function code F1 opens the interface prior to read/write access of a current set value. When the function code (F1) is executed, an open interface flag in the CMOS memory is set. This flag is used to prevent the system configuration from being changed when INT15h is erroneously executed. Upon executing the Get/Set function of the system configuration, the SCI checks whether or not the SCI opens and executes a process only when the open interface flag is set. Function code F2 closes the interface. Function code F3 loads the currently set state of the system. Function code F4 renews settings of the system. Function code F5 sets the default values of the system.

The BIOS interface executes the following I/O instruction as follows (step S22):

IN AL, OB2h

This instruction is an instruction for inputting the contents of the I/O port at address OB2h in the AL register of the CPU 11. Upon execution of this IN instruction, I/O address OB2h is output to the system bus 18. This I/O address value of OB2h coincides with the value of the I/O base address set in the I/O base address register 126. Therefore, the IN instruction in step S22 causes the I/O trap SMI generator 121 to generate an I/O trap SMI signal, so that control is shifted to the SMI handler.

When control is returned to the operating system or application program upon execution of the RSM instruction of the SMI handler, this BIOS interface refers to the contents of a predetermined register of the CPU 11 to check a return value such as a function completion code or an output result from the BIOS driver (step S23). The completion code is set in the AX register. The error codes and the contents of errors are as follows:

Error code 0044 (CF=0) normal termination

80xx (CF=1) subfunction error or system does not support this function

81xx (CF=1) interface already opened

82xx (CF=1) interface not opened

83xx (CF=1) input data error

84xx (CF=1) write protected error

86xx (CF=1) SCI not present

8Cxx (CF=1) device not ready

8Dxx (CF=1) device error

8Exx (CF=1) device not installed

F?xx protect mode SCI not present

A program interface process of the SMI handler will be described with reference to a flow chart in FIG. 8.

The SMI handler reads SMI status information of the SMI status register 124 of the system controller 12 (step S31) and checks using this SMI status information whether the SMI is generated by I/O trapping (step S32). If NO in step S32, the SMI handler executes a corresponding function process; otherwise, the SMI handler executes the following process.

More specifically, the SMI handler sets in the CPU register the contents of the CPU status data saved in the SMRAM 13A by the CPU 11 upon generation of the previous SMI (step S34).

The SMI handler then calls the function execution routine designated by the function code in the AH register for the specific BIOS driver and executes the called function execution routine (step S34).

When the function execution routine process is completed, the SMI handler saves the current contents of the CPU registers in the SMRAM 13A (step S35) and executes an RSM instruction.

Figure 9:
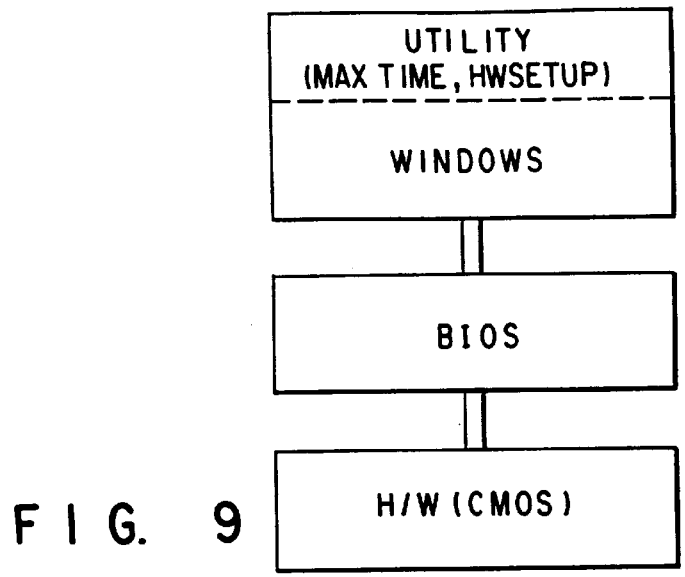
FIG. 9 is a view showing the principle of an enhanced CMOS memory access interface (ECAI) according to the present invention.

Upon execution of this RSM instruction, the CPU status data is restored from the SMRAM 13A to the CPU registers. An output value from the function execution routine is transferred to the operating system or application program through the CPU registers. The principle of the flow charts in FIGS. 7 and 8 is shown in FIG. 9. Referring to FIG. 9, a utility called MaxTime is a kind of power management program.

Figure 12A:
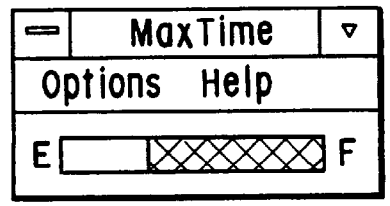
FIGS. 12A through 12C are views showing a utility operating in the protect mode, wherein the SMI is generated in accordance with the IN instruction to the specific I/O port to cause a MaxTime utility for managing the power supply in the SMI handler to display battery gauge formats.
Figure 12B:
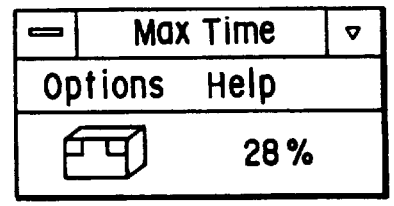
Figure 12C:
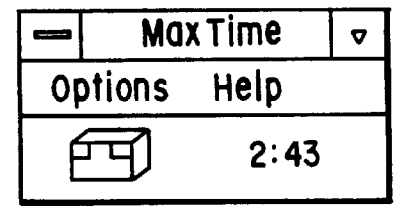
Figure 13:
FIG. 13 is a table showing the display formats of the MaxTime utility shown in FIGS. 12A through 12C.
Figure 14:
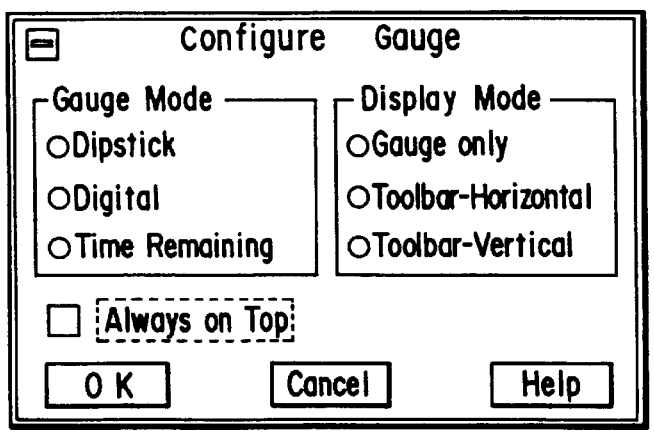
FIG. 14 is a view showing a configure gauge dialogue box displayed by the MaxTime utility.

The MaxTime power management program lets a user monitor his battery gauge, select battery-saving options and control some operational functions without leaving Windows. This program is a Windows application and may only be used within Windows. To access MaxTime, double-click on the MaxTime icon. The MaxTime battery guage window as shown in FIGS. 12A through 12C displays the current battery charge. Menus at the top of the window provide access to a list of options and to online help. MaxTime displays the remaining battery charge in a dipstick, digital or time remaining format. The digital format showns the remaining time as a percentage. The table shown in FIG. 13 summarizes the MaxTime display formats:

The Configure Gauge dialog box offers several display formats for MaxTime. To open the Configure Gauage dialog box, choose Configure Gauage . . . from the MaxTime Options menu. MaxTime displays the Configure Gauge dialog box as shown in FIG. 14. The following tables describe the various options in the Configure Gauage dialog box.

Gauge Mode

Gauge mode lets a user to choose the look of the gauge. You have three choices as described in the following table:

Option: Meaning

Dipstick: formats the battery gauge to show the charge as a dipstick display

Digital: formats the battery gauge to show the percent of the charge currently remaining Time: formats the battery gauge to show the time remaining These options determine whether MaxTime shows only the battery gauge or includes a small toolbar along with the gauage. The toolbar, which may display vertically or horizontally, indicates the current status of several system functions.

The following table describes the three choices:

| Option | Meaning |
|---|---|
| Gauge only | shows the battery gauge only, without the toolbar |

Toolbar-Horizontal shows the toolbar horizontally

Toolbar-vertical shows the toolbar vertically

The horizontal MaxTime battery gauage and toolbar is shown in FIG. 15.

A user may also click each of the icons on the toolbar to change the setting for that system function. For example, clicking an the resume icon switches the computer between resume mode and boot mode. Clicking on an icon has the same effect as pressing the corresponding hotkey.

Enabling "Always on Top" option keeps the battery gauge window on top of all other windows.

If the battery charge is unknown, a user can set is by choosing Set Battery Status . . . from the Options menu. MaxTime displays the Set battery Capacity dialog box as shown in FIG. 16.:

To set the battery charge, click and drage the scroll box toward Full until he sees the estimated percent of capacity displayed.

If the actual battery status becomes known to the system while this dialog box is displayed, MaxTime will now allow an incorrect setting to be entered.

The following table summarizes the buttons on this dialog box:

| Button | Meaning |
|---|---|
| OK | Selects current setting and closes the dialog box |
| Cancel | Ignores changes and closes the dialog box |
| Help | Accesses online help |

User's manual setting is verified by the system and updated to the correct value, if necessary.

Figure 17:
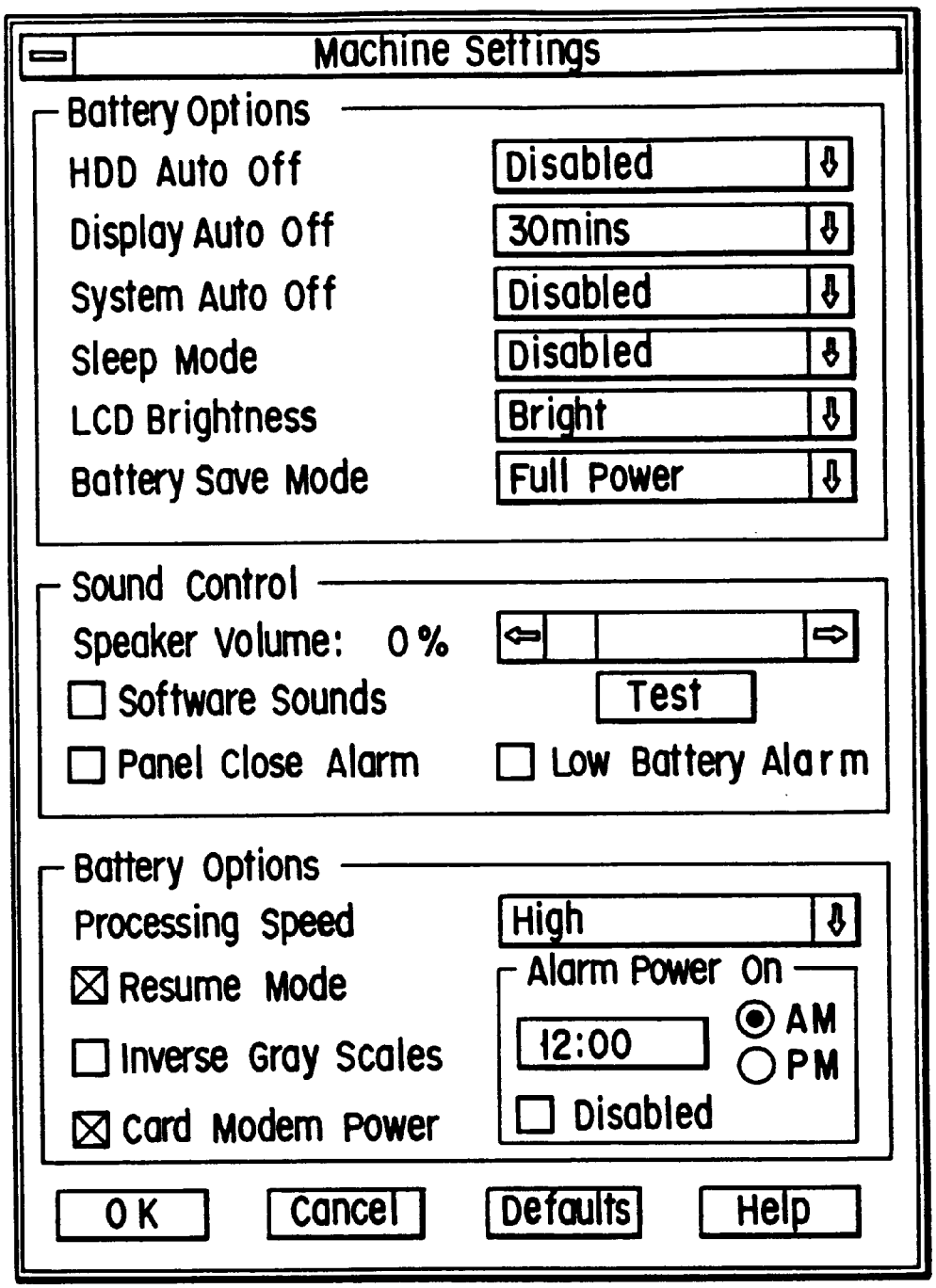
FIG. 17 is a view showing a machine settings dialogue box displayed by the MaxTime utility.

To change battery-saving options and set the system sounds, Machine Settings are choosen from the Options Menu. MaxTime displays the Machine Settings dialog box as shown in FIG. 17. Changing the options in MaxTime does't require you to restart the computer.

The following tables summarize the items found in the Machine Settings dialog box.

Refer to the Power chapter for more information.

| Option | Settings |
|---|---|
| HDD Auto off | Disabled (default) |
| | 03 Min. |
| | 05 Min. |
| | 10 Min. |
| | 15 Min. |
| | 20 Min. |
| | 30 Min. |
| Display Auto Off | Disabled |
| | 01 Min. |
| | 03 Min. |
| | 05 Min. |
| | 10 Min. |
| | 15 Min. |
| | 20 Min. |
| | 30 Min. |
| | Always Off |
| System Auto off | Disabled |
| | 10 Min. |
| | 20 Min. |
| | 30 Min. |
| | 40 Min. |
| | 50 Min. |
| | 60 Min. |
| Sleep Mode | Enabled |
| | Disabled |
| LCD Brightness | Bright |
| | Semi-Bright |
| Battery Save Mode | Full Power |
| Mode | Low power (default) |
| | User Setting |

Sound Control

| Option | Settings |
|---|---|
| Speaker Volume | Click and drage scroll box to set |
| Test Button | Beeps at selected volume |
| Software Sunds | Enabled (checked: default) |
| | Disabled (no check) |
| Panel Close Alarm | Enabled (checked: default) |
| | Disabled (not check) |
| Low Battery | Enabled (checked: default) |
| | Disabled (not check) |

System Configuration

| Option | Settings |
|---|---|
| Processing | High |
| Speed | Low |
| Resume Mode | Resume Mode (checked) |
| | Boot Mode (not checked: default) |
| Inverse Gray | Reverse Video (checked) |
| Scales | Normal Video (no check) |
| Card Modem | Enabled (checked) |
| Power | Disabled (no check) |
| | This option is available when a Toshiba card modem is installed |
| Alarm Power On | Disabled |
| | Hour: Minute |
| OK | Saves the changes you made |
| Cancel | Cancels the changes you made |
| Defaults | Returns all options to their default settings |
| Help | Accesses online help |

FIG. 9 is a view showing the principle of the present invention. When the OS such as Windows or a utility (e.g., MaxTime or HWSETUP) issues an ESCI to the BIOS, the BIOS reads/writes the system configuration for hardware (e.g., a CMOS memory). When the ECAI is issued, the CMOS memory is subjected to read/write access.

FIG. 10 is a flow chart showing control performed when an ESCI is started.

Referring to FIG. 10, the CPU 11 checks in step S41 if a function is a supported function. More specifically, the CPU 11 checks whether the function code is "44F2h" (Close Interface), "44F3h" (Get System Configuration), "44F4h" (Set System configuration), or "44F5h" (Set Default Configuration). Otherwise, this routine directly returns to the main routine. If the function code is one of the above codes, the designated function is performed in step S43. The CPU 11 checks in step S45 if the function is a supported function. In this embodiment, the following subfunctions are supported:

| Code | Subfunction |
| --- | --- |
| ** System and power management ** | |
| 0100h | Get Power-up Mode |
| 0101h | Get Battery Save Mode |
| 0102h | Get Processing Speed |
| 0103h | Get Snap Mode |
| 0104h | Get Sleep Mode |
| 0105h | Get Display Auto Off Mode |
| 0106h | Get HDD Auto Off Mode |
| 0107h | Get FDD Auto Off Mode |
| 0108h | Get Cache Status |
| 0109h | Get Speaker Volume |
| 010Ah | Get System Speaker Status |
| 010Bh | Get Battery Alarm Mode |
| 010Ch | Get Panel Close Alarm Mode |
| 010Dh | Get Panel Power On/Off Mode |
| 010Eh | Get Alarm Power On Date |
| 010Fh | Get Alarm Power On Time |
| 0111h | Get Remaining Battery Power as Percentage |
| 0112h | Get Remaining Battery Power in Time |
| 0113h | Get Battery Status Mode |
| 0114h | Get Modem Power Status |
| 0115h | Get LCD Brightness Status |
| 0116h | Get Popup Window Mode |
| 0117h | Get System Date |
| 0118h | Get System Time |
| 0119h | Get Table Auto off Mode |
| 011Ah | Get Hotkey Mode |
| 011Bh | Get Max. LCD Brightness Status |
| 011Ch | Get DAC digital Output Status |
| 011Dh | Bet Boot Priority |
| ** MEMORY ** | |
| 0200h | Get Hard RAM Size |
| 0201h | Get Shadow RAM Mode |
| ** DISPLAY ** | |
| 0300h | Get Display Device Mode |
| 8300h | Get Current Display Device Mode |
| 0301h | Get Color Emulation Mode |
| 0302h | Get Gray Scale Level |
| 0303h | Get Display Normal/Reverse Mode |
| 0304h | Get Display Contrast |
| 0305h | Get display Brightness |
| ** HDD/FDD ** | |
| 0400h | Get HDD (#0) Type |
| 0401h | Get HDD (#1) Type |
| ** I/O PORT AND KEYBOARD ** | |
| 0500h | Get Serial Port Mode |
| 0501h | Get Parallel Port Mode |
| 0502h | Get Keyboard Type |
| 0503h | Get PCMCIA Slot Mode |
| 0504h | Get Keyboard Initial State |
| 0505h | Get Pointing Stick Mode |
| 0510h | Get SCSI Mode |
| 0520h | Get Sound System Mode |
| 0521h | Get Sound System Power |

When a nonsupported subfunction is designated, the CPU 11 performs an error process in step S49, and the flow returns to the main routine.

However, if the function is determined to be a supported subfunction, the designated subfunction is executed in step S47. For example, the function of "0100h" (Get Power-up Mode) allows loading of information from the CMOS whether the current mode is a power-up (boot mode) or a resume mode. When this function code is designated, information is read out from a location where the power-up mode settings are stored. The readout information is returned to an output register. To execute the function, "44F3h" is set as the function code in the AH register, and "0100h" is set as the subfunction code in the BX register. When this function is executed and normally completed in step S47, "00h" is set in each of the AH and AL registers, "0000h" (Binary Data Type) is set in the BX register, "0000h" (Suspend & Resume Disable (Power-up Mode)) or "0001h" (Suspend & Resume Enable (Resume Mode)) is set in the CX register, the default value ("0000h" in the power-up mode) is set in the SI register, and "0" is set in the CF register. The default value set in the SI register is the default value set in the CMOS so as to save it when the contents of the CMOS are destroyed. More specifically, "0000h" representing the power-up mode of the power-up and resume modes is set in the SI register as the default value. For example, a check sum error value in the data of the CMOS or a default value upon pressing the home key is set in the CF register.

When an error occurs, "1" is set in the CF register, and "80h" (a subfunction code error or this system does not support this function code), "82h" (the interface is not yet open), or "86h" (the system does not support the SCI) is set in the AH register.

The ECAI (Enhanced CMOS Access Interface) will be described below. The ECAI is started by the I/O trap function of the SMI described above and reads data from the CMOS. More specifically, (i) the ECAI reads data from a CMOS having a designated index, and (ii) the ECAI writes data in a CMOS having the designated index. Conventionally, when Windows or OS/2 is started, a CMOS area from an index of 40h cannot be properly read/write-accessed using ports 70h and 71h. This problem can be solved utilizing the ECAI function.

Read Access of CMOS Data

In this case, "FCh" is set in the AH register as the input register, and the CMOS index is set in the BX register. When the CMOS read access is normally completed, "0044h" (CF=0) is set in the AX register of the output register, and the CMOS data is set in the CL register. When abnormal completion occurs (when a nonexistent index is set), "80xxh" (CF=1) is set in the AX register.

Write Access of CMOS Data

In this case, "FDh" (CF=0) is set in the AH register as the input register, the CMOS index is set in the BX register, and data to be written in the CMOS is set in the CL register. When the process is normally completely, "0044h" (CF=0) is set in the AX register as the output register. When abnormal completion occurs (a nonexistent index is set), "80xxh" (CF=1) is set in the AX register.

Even if the CPU is operating in the protect mode utilizing the SMI using the I/O trap instruction, the CMOS data can be read/written.

As described above, in the computer system of this embodiment, when a BIOS driver call request is generated at the OS environment operated in the protect mode, the CPU 11 is automatically switched from the protect mode to the SMM in accordance with the I/O trap SMI upon execution of the IN or OUT instruction, and the corresponding BIOS driver is executed in the SMM. When the process of the BIOS driver is completed, the mode is switched from the SMM to the protect mode, thereby shifting control to the OS.

The BIOS driver can be directly called and executed in the protect mode without building a routine for switching the CPU operating mode in the OS or application program.

A procedure necessary for generating an SMI signal is to execute an IN or OUT instruction because the I/O trap SMI is utilized. For this reason, the SMI signal can be immediately generated in response to a BIOS driver call request, thereby calling the BIOS driver at high speed.

After the CPU status data upon completion of the function execution routine of the BIOS driver is temporarily saved in the SMRAM 13, the SMI handler executes the RSM instruction. For this reason, output data and the like obtained from the function execution routine can be efficiently transferred to the operating system or the like through the registers of the CPU 11.

In this embodiment, the I/O trap SMI interface is utilized for calling only a specific BIOS driver. However, as described with reference to the I/O trap SMI generator 121 in FIG. 3, the plurality of I/O trap SMI generators for trapping different I/O addresses can be used to cause the I/O trap SMI to call a plurality of BIOS drivers. In this case, a BIOS driver to be called is determined by a trap address which causes generation of the I/O trap SRI, i.e., the I/O trap SMI generator which has generated the I/O trap SMI.

In the embodiment shown in FIG. 7, the I/O trap SMI is generated using the input instruction. However, an I/O trap SMI may be generated using an output instruction (OUT instruction). Any unused I/O port address not assigned with any I/O unit can be used as the I/O base address.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system comprising:
   a CPU;
   a first register arranged in the CPU;
   means for setting a predetermined function code in the first register;
   means for executing an I/O instruction for a predetermined I/O port address after the setting of the predetermined function code;
   means for trapping the predetermined I/O port address after executing the I/O instruction;
   means for issuing an interrupt signal in response to the trapping of the predetermined I/O port address;
   means for executing a predetermined function based on the predetermined function code set in the first register in response to the interrupt signal; and
   means for restoring a result of the execution of the predetermined function to the first register after the execution of the predetermined function.

2. A computer system according to claim 1, further comprising means for changing an operating mode of the CPU in response to the interrupt signal.

3. A computer system according to claim 1, wherein the trapping means comprises:
   a second register storing the predetermined I/O address; and
   means for comparing a predetermined address range determined by the predetermined I/O address stored in the second register and the trapped predetermined I/O port address.

4. A computer system according to claim 1, wherein the CPU executes a function execution routine for at least one of a hardware control program and a system configuration interface program for setting/modifying a system configuration of the computer system in accordance with the predetermined function code.

5. The computer system according to claim 1, wherein said predetermined function code indicates at least one of functions of SCI support check, open interface, close interface, get a system configuration, set a system configuration, and set a default configuration.

6. A computer system according to claim 4, wherein the CPU operates in one of a first operating mode using a first address calculation form and capable of accessing a first memory space, a second operating mode using a second address calculation form and capable of accessing a second memory space larger than the first memory space, and a system management mode using an address calculation form substantially identical to the first address calculation form and capable of executing a predetermined system management program, and the CPU is set to the system management mode in response to the interrupt signal.

7. A computer system according to claim 6, further comprising a memory in which status information of the CPU is saved in response to the interrupt request, and
   the predetermined system management program calls the function execution routine for at least one of the hardware control program and the system configuration interface program in accordance with the status information saved in the memory after the CPU is set to the system management mode.

8. A method for controlling a computer system, comprising the steps of:
   setting a predetermined function code in a first register arranged in a CPU;
   executing an I/O instruction for a predetermined I/O port address after the setting of the predetermined function code;
   trapping the predetermined I/O port address after executing the I/O instruction;
   issuing an interrupt signal in response to the trapping of the predetermined I/O port address;
   executing a predetermined function based on the predetermined function code set in the first register in response to the interrupt signal; and
   restoring a result of the execution of the predetermined function to the first register after the execution of the predetermined function.

9. A method for controlling a computer system according to claim 8, further comprising the step of changing an operating mode of the CPU in response to the interrupt signal.

10. A method of controlling a computer system according to claim 8, wherein the trapping step comprises the substeps of:
    storing the predetermined I/O address in a second register; and
    comparing a predetermined address range determined by the predetermined I/O address stored in the second register and the predetermined trapped I/O port address.

11. A method of controlling a computer system according to claim 8, wherein the CPU executes a function execution routine for at least one of a hardware control program and a system configuration interface program for setting/modifying a system configuration of the computer system in accordance with the predetermined function code.

12. A method of controlling a computer system according to claim 11, wherein the CPU operates in one of a first operating mode using a first address calculation form and capable of accessing a first memory space, a second operating mode using a second address calculation form and capable of accessing a second memory space larger than the first memory space, and a system management mode using an address calculation form substantially identical to the first address calculation form and capable of executing a predetermined system management program, and the CPU is set to the system management mode in response to the interrupt signal.

13. A method of controlling a computer system according to claim 12, further comprising the step of:

saving status information in a memory of the CPU in response to the interrupt signal, and the predetermined system management program calls the function execution routine for the hardware control program and the system configuration interface program in accordance with the status information saved in the memory after the CPU is set to the system management mode.

14. A computer system comprising:

a CPU;

a first register arranged in the CPU;

a second register configured to store system configuration information;

means for setting a predetermined function code and a predetermined subfunction code in the first register, the predetermined function code indicative of a predetermined operation with regard to the system configuration information, and the predetermined subfunction code including an indication of a specific system configuration information which is subjected to the predetermined operation;

means for executing an I/O interruption for a predetermined I/O port address;

means for trapping the predetermined I/O port address after the execution of the I/O instruction;

means for issuing an interrupt signal in response to the trapping of the predetermined I/O port address; and operation means for executing the predetermined operation with regard to the specific system configuration information in response to the interrupt signal, wherein the predetermined operation includes at least one of reading the system configuration information from the second register, setting the system configuration information in the second register, and setting a default value of the system configuration information in the second register; and wherein the predetermined subfunction includes at least one of reading the specific system configuration information from the second register, setting the specific system configuration information in the second register, and setting a default value of the specific system configuration information in the second register.

15. The computer system according to claim 14, wherein the operation means determines whether or not the predetermined subfunction is supported by the computer system, executes the predetermined subfunction when the computer system supports the predetermined subfunction, and sets a value indicative of an error in the first register when the computer system does not support the predetermined subfunction.

16. The computer system according to claim 14, wherein said predetermined function code indicates at least one of functions of SCI support check, open interface, close interface, get a system configuration, set a system configuration, and set a default configuration.

17. The computer system according to claim 14, wherein said predetermined subfunction code indicates a function of getting information of a hard disk drive connected to the computer system.

18. The computer system according to claim 14, wherein said predetermined subfunction code indicates a function of getting information about at least one of serial port mode, parallel port mode, a keyboard connected to the computer system, a card slot arranged in the computer system, a pointing device connected to the computer system, SCSI mode, and a sound system of the computer system.

19. The computer system according to claim 14, wherein said predetermined subfunction code indicates at least one of functions of getting power management information of the computer system and getting system information of the computer system.

20. The computer system according to claim 14, wherein said predetermined subfunction code indicates a function of getting information about at least one of hard RAM size and shadow RAM mode.

21. The computer system according to claim 14, wherein said predetermined subfunction code indicates a function of getting information about a display connected to the computer system and at least one of a display device mode, current display device mode, color emulation mode, gray scale mode, display normal/reverse mode, display contrast, and display brightness.

22. The computer system according to claim 19, wherein said predetermined subfunction code indicates a function of getting information about at least one of power-up mode, battery save mode, processing speed of the computer-system, snap mode, sleep mode, display auto-off mode, HDD auto-off mode, FDD auto-off mode, battery alarm mode, panel close alarm mode, panel power on/off mode, alarm power-on date, alarm power-on time, system auto-off mode, remaining battery power as percentage, remaining battery power in time, battery status mode, modem power status, and tablet auto-off mode.

23. The computer system according to claim 19, wherein said predetermined subfunction code indicates a function of getting information about at least one of cache status, speaker volume, system speaker status, LCD brightness status, popup window mode, system date, system time, hotkey mode, maximum LCD brightness states, DAC digital output status, and boot priority.

* * * * *

UNITED STATES PATENT AND TRADEMARK OFFICE
CERTIFICATE OF CORRECTION

PATENT NO. : 6,282,645 B1
DATED : August 28, 2001
INVENTOR(S) : Yamaki

It is certified that error appears in the above-identified patent and that said Letters Patent is hereby corrected as shown below:

<u>Title page,</u>
Item [45], and the Notice of information should read:

-- (*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 104 days.

This patent is subject to a terminal disclaimer. --

Signed and Sealed this

Twenty-fifth Day of June, 2002

Attest:

Attesting Officer

JAMES E. ROGAN
*Director of the United States Patent and Trademark Office*